UNITED STATES PATENT OFFICE.

THOMAS R. COOK AND PAUL E. NORRIS, OF PITTSBURGH, PENNSYLVANIA, ASSIGNORS TO WESTINGHOUSE UNION BATTERY COMPANY, OF SWISSVALE, PENNSYLVANIA, A CORPORATION OF PENNSYLVANIA.

TERMINAL STRUCTURE FOR ELECTRIC BATTERIES.

1,411,989.     Specification of Letters Patent.     Patented Apr. 4, 1922.

Application filed March 10, 1920, Serial No. 364,795. Renewed August 16, 1921. Serial No. 492,835.

*To all whom it may concern:*

Be it known that we, THOMAS R. COOK and PAUL E. NORRIS, citizens of the United States, residing at Pittsburgh, in the county of Allegheny and State of Pennsylvania, have invented certain new and useful Improvements in Terminal Structures for Electric Batteries, of which the following is a specification.

Our invention relates to electric batteries and particularly to terminal structures for such batteries. The invention is particularly well adapted for, though not limited to, batteries of the secondary or storage type.

One object of our provision is the provision of a terminal structure which is effective to prevent leakage of the liquid contained in the battery, which comprises the minimum number of parts, and which can readily be disassembled to permit renewal of the packing without destroying or damaging any of the parts.

We will describe two forms of terminal structures embodying our invention, and will then point out the novel features thereof in claims.

Figure 1:
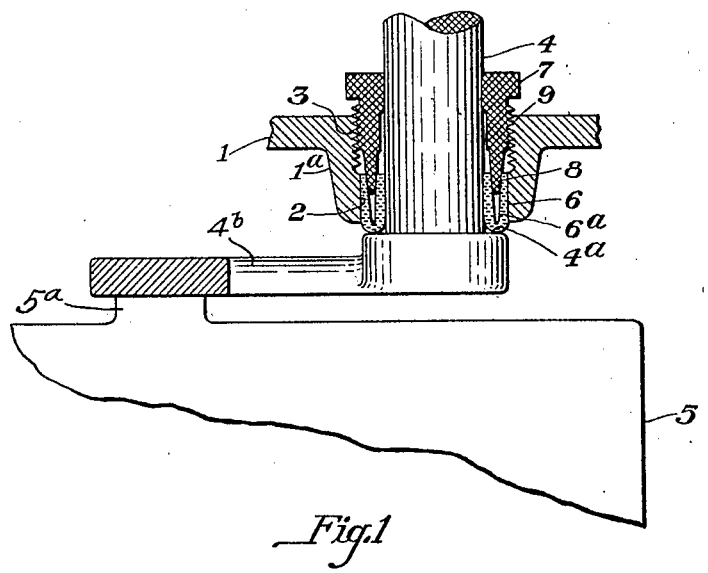
Figure 2:
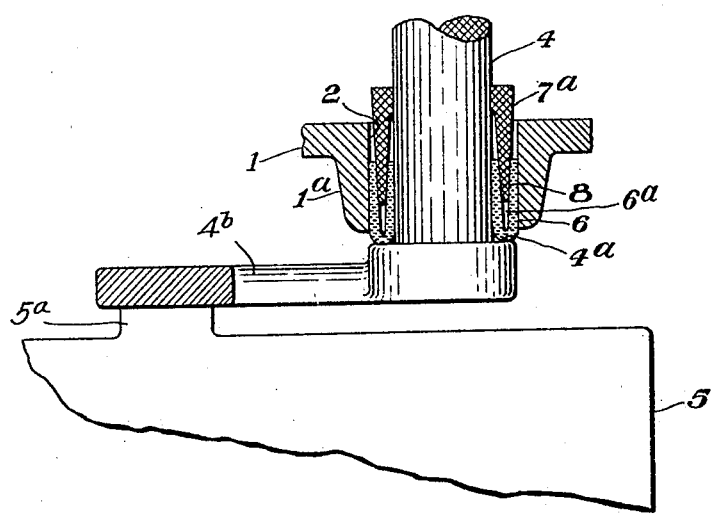

In the accompanying drawings, Fig. 1 is a view showing in vertical section one form of terminal structure embodying our invention, and Fig. 2 is a view similar to Fig. 1 but showing a modified structure also embodying our invention.

Similar reference characters refer to similar parts in both of the views.

Referring first to Fig. 1, the reference character 1 designates the top plate or cover of a battery cell, which cover is provided with a socket 1ª having a round aperture 2. The upper part of this aperture is screwthreaded at 3 to receive a follower as explained hereinafter. Projecting through the aperture 2 is a terminal post 4, which is attached in suitable manner to one of the sets of battery plates 5. As here shown the post 4 is integral with a connecting strap 4ᵇ to which each plate 5 of one of the sets is attached by means of the usual lug 5ª at the top of the plate. At the point where the post joins the connecting strap a shoulder 4ª is provided, which shoulder is preferably located adjacent the lower end of the socket 1ª.

Surrounding the post 4 is a sleeve-like gasket 6 of suitable material such as soft rubber, which gasket rests on the shoulder 4ª and extends upwardly between the post 4 and the walls of the aperture 2 to a point near the lower end of the screw threads 3. This gasket is provided with a recess 6ª which extends all the way around the gasket, and which also extends from the top well down into the gasket. The cross section of the gasket at any point is in the shape of a U or a V.

The reference character 7 designates a follower, which is sleeved over the terminal post 4 and which, as here shown, is in the form of a nut provided with screw threads 9 adapted to coact with the threads 3 in the aperture 2. The lower end of this follower is provided with a wedge-shaped projection 8 which extends all the way around the follower and which is adapted to enter the recess 6ª in the gasket 6.

To assemble the structure, the gasket 6 is first placed in position on the post 4 with its lower end resting on the shoulder 4ª, and the follower 7 is then screwed down so that the wedge-shaped projection 8 enters the recess 6ª. The result of this downward movement of the follower is to force the inner surface of gasket 6 into engagement with the post 4 and the outer surface of this gasket into engagement with the wall of the aperture 2.

When it becomes necessary to renew the packing, the follower 7 is withdrawn, gasket 6 is removed, a new gasket substituted therefor, and the follower 7 is replaced. It will be observed that during this procedure no part of the structure is destroyed or damaged in any way.

Referring now to Fig. 2, the modified structure shown herein is substantially the same as that shown in Fig. 1, except that the follower, which is here designated 7ª, is made for a driving fit on the post 4, this post being slightly tapered for the purpose if necessary, and except that the gasket 6 forms a cushion between the cell cover and the plates and so tends to relieve the plates from excessive shocks, and except that the wall of hole 2 in the cell cover is tapered as shown, being larger at the bottom of socket 1ª than at the top. The screw threads 3 and 9 of Fig. 1 are, of course, eliminated. The procedure to assemble the structure shown in Fig. 2 is the same as the procedure in connection with Fig. 1, the only difference being that the follower 7ª is driven into place by a force applied in the line of longitudinal movement of the follower, instead of by turning the follower as in Fig. 1.

The structure of Fig. 2 is not specifically claimed in this case, but is made the subject of a co-pending application filed Dec. 16, 1920, Serial No. 431124.

In both of the illustrated forms of our invention it will be observed that the walls of the recess 6ª form acute angles with the vertical, that is, with the line of longitudinal movement of the follower, and that the sides of the projection 8 also form acute angles with the vertical. It follows that the gasket 6 may be expanded against the post 4 and the wall of aperture 2 with a comparatively heavy pressure by a comparatively small amount of force applied to the follower in the direction of its longitudinal movement.

It will be observed that in both forms of our invention the escape of the battery liquid between the post 4 and the follower is prevented by one side of the gasket 6 and that the escape of the liquid between the follower and the cell cover 1 is prevented by the other side of the gasket 6. It will be seen, therefore, that the terminal structure is effectively sealed by only one gasket.

Although we have herein shown and described only two forms of terminal structures embodying our invention, it is understood that various changes and modifications may be made therein within the scope of the appended claims without departing from the spirit and scope of our invention.

Having thus described our invention, what we claim is:

1. In an electric battery, a cell cover provided with an aperture having screw threads adjacent its upper end, a terminal post passing through said aperture and provided with a shoulder, a gasket surrounding said post and resting on said shoulder, said gasket having a circular recess extending downwardly from its upper end, and a follower sleeved on said post and provided with external threads co-operating with the screw threads in said aperture, said follower having a circular projection on its lower end adapted to enter the recess in said gasket to spread the gasket against the post and the wall of said aperture.

2. In an electric battery, a cell cover provided with an aperture having screw threads adjacent its upper end, a terminal post passing through said aperture and provided with a shoulder adjacent the lower surface of said cell cover, a gasket surrounding said post and located between said shoulder and the lower end of said screw threads, said gasket having a circular recess extending downwardly from its upper end, and a follower sleeved on said post and provided with threads co-operating with the screw threads in said aperture, said follower having a circular projection on its lower end adapted to enter the recess in said gasket to spread the gasket against the post and the wall of said aperture.

3. In an electric battery, an apertured cell cover, a terminal post projecting through the aperture and provided with a shoulder, a gasket sleeved on said post and supported by said shoulder, the gasket having a circular recess extending downwardly from its upper end, and a follower sleeved on said post and attached to said cell cover, said follower having on its lower end a circular projection adapted to enter the recess in said gasket.

4. In an electric battery, an apertured cell cover, a terminal post projecting through the aperture and provided with a shoulder, a gasket sleeved on said post and supported by said shoulder and having a circular recess extending from its upper end well down towards the lower end, the walls of said recess forming acute angles with the vertical, and a follower sleeved on said post and having on its lower end a circular projection adapted to enter said recess in the gasket.

In testimony whereof we affix our signatures.

THOMAS R. COOK.
PAUL E. NORRIS.